United States Patent
Bourdoncle et al.

(10) Patent No.: US 7,368,025 B2
(45) Date of Patent: May 6, 2008

(54) METHOD FOR MAKING A THERMALLY PROTECTIVE COATING FOR A PROPULSIVE UNIT STRUCTURE

(75) Inventors: Jacques Bourdoncle, Saint Aubin du Medoc (FR); Alain Coupard, La Brede (FR)

(73) Assignee: Snecma Propulsion Solide, Le Haillan (FR)

( * ) Notice: Subject to any disclaimer, the term of this patent is extended or adjusted under 35 U.S.C. 154(b) by 508 days.

(21) Appl. No.: 10/540,790

(22) PCT Filed: Dec. 17, 2003

(86) PCT No.: PCT/FR03/03763

§ 371 (c)(1), (2), (4) Date: Jun. 27, 2005

(87) PCT Pub. No.: WO2004/065106

PCT Pub. Date: Aug. 5, 2004

(65) Prior Publication Data

US 2006/0073282 A1    Apr. 6, 2006

(30) Foreign Application Priority Data

Dec. 31, 2002   (FR)  ................................ 02 16905

(51) Int. Cl.
B65H 81/00 (2006.01)

(52) U.S. Cl. ........................ 156/172; 156/169; 156/191; 156/242

(58) Field of Classification Search ................. 156/169, 156/173, 172, 175, 184, 187, 191, 242
See application file for complete search history.

(56) References Cited

U.S. PATENT DOCUMENTS

| | | | |
|---|---|---|---|
| 3,464,935 A * | 9/1969 | Sepkoski et al. | 524/590 |
| 3,553,978 A | 1/1971 | Williams | |
| 3,695,959 A | 10/1972 | Keith et al. | |
| 3,916,953 A | 11/1975 | Nagayoshi et al. | |
| 4,501,841 A * | 2/1985 | Herring | 524/411 |
| 4,596,619 A * | 6/1986 | Marks | 156/171 |
| H219 H * | 2/1987 | Sayles | 156/169 |
| 4,878,431 A * | 11/1989 | Herring | 102/290 |
| 5,069,133 A * | 12/1991 | Canterberry et al. | 102/332 |
| 5,117,757 A * | 6/1992 | Marks | 102/287 |
| 6,193,917 B1 | 2/2001 | DeLay | |

FOREIGN PATENT DOCUMENTS

FR          2 673 141        8/1992

* cited by examiner

*Primary Examiner*—Jeff H. Aftergut
(74) *Attorney, Agent, or Firm*—Weingarten, Schurgin, Gagnebin & Lebovici LLP

(57) ABSTRACT

A method of making a thermally-protective coating on a thruster structure, the method consisting in: continuously measuring out and mixing (14) at least one polyurethane and a mixture of polymerization agents in which specific fillers have previously been dispersed; coating a rotating cylindrical support surface (2) by continuously casting a strip (18) of touching turns of the resulting mixture; and pre-polymerizing the resulting coating at ambient pressure so that said polyurethane becomes polymerized sufficiently to be capable of being stressed mechanically.

24 Claims, 1 Drawing Sheet

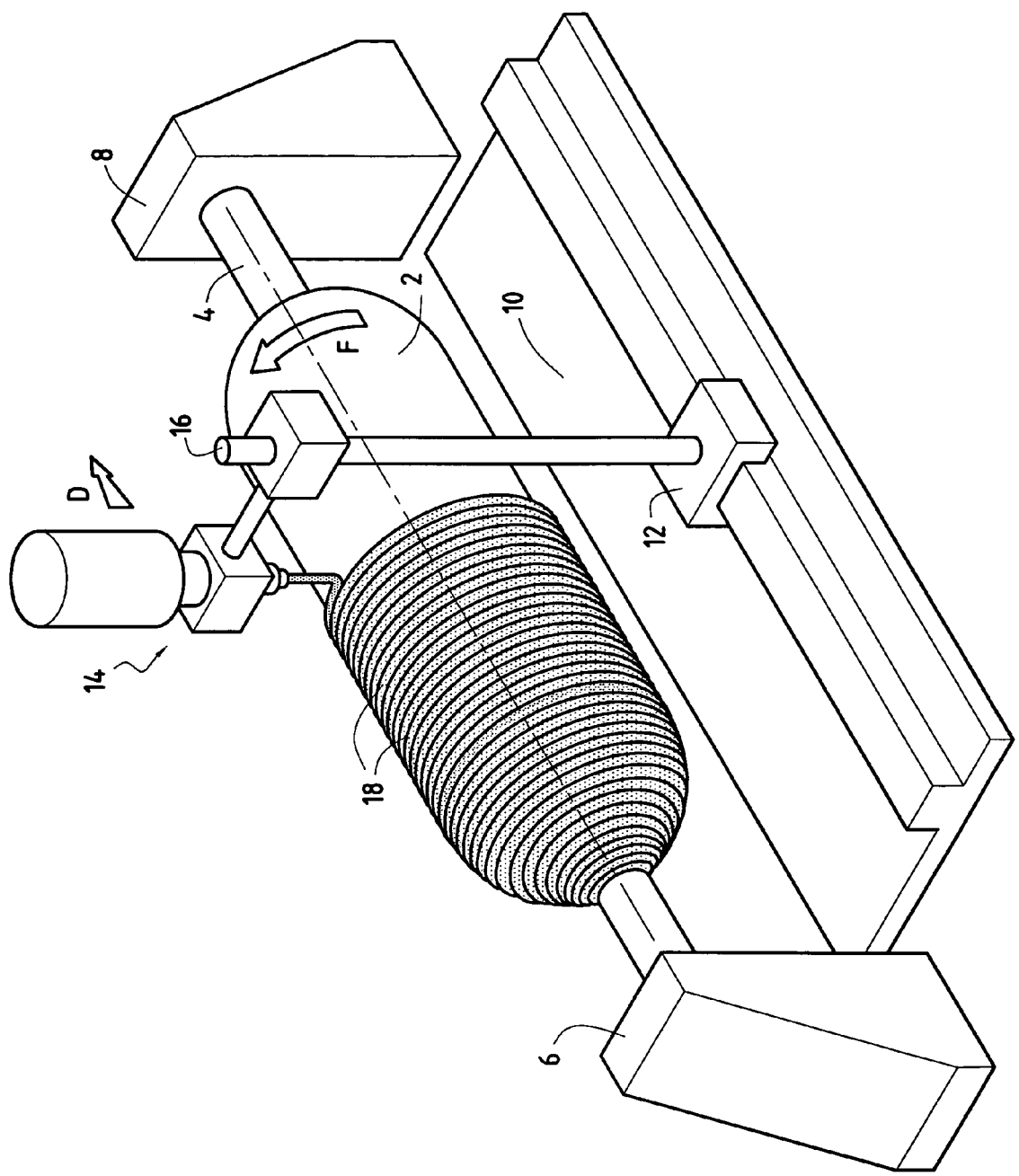

METHOD FOR MAKING A THERMALLY PROTECTIVE COATING FOR A PROPULSIVE UNIT STRUCTURE

This application is a §371 national phase filing of PCT/FR2003/003763 filed Dec. 17, 2003, and claims priority to a French application No. 02/16905 filed Dec. 31, 2002.

BACKGROUND OF THE INVENTION

The present invention relates to a method of making an internal and/or external thermally-protective coating for a thruster structure, in particular a structure forming part of a solid-propellant thruster. The invention also relates to a method of making a thruster structure, and to the thruster structure obtained thereby.

The structure of a solid propellant thruster essentially comprises a casing, e.g. made of composite material and generally provided with an internal thermally-protective coating that needs to perform three essential functions: providing the composite casing with thermal protection against attack from the hot gas that results from combustion of the propellant; attenuating the mechanical stresses generated by the casing deforming under pressure during combustion of the propellant; and sealing the casing against gas leaks.

Various methods exist for applying thermally-protective coatings to the inside of the casing of a thruster structure. One of them consists in starting by using means that are conventional in the rubber industry (open mills, kneaders, ... ) to prepare a rubber of viscous consistency in the semi-manufactured non-vulcanized state, and in transforming the rubber into elastomer sheets for cutting out and then draping on a mandrel prior to performing vulcanization in an autoclave. The various thermal protection elements formed in that way are then disassembled from their respective mandrels in order to be assembled on another mandrel (generally a dismountable mandrel made of metal) used for winding the filaments of the composite casing onto the thermal protection prepared in that way. That method leads to long manufacturing cycles which cause that technology to be particularly expensive to implement. It requires a large amount of tooling and also presents a succession of operations that are discontinuous and some of which are manual. The use of a plurality of different mandrels during the various steps in implementation of the method is also time-consuming and lengthens the duration of the manufacturing cycle.

Another type of known method enables implementation costs to be reduced. It consists in covering a mandrel in a layer of elastomer prior to forming the casing of the thruster structure by winding the filament of a composite material. In such a method, the elastomer layer is made by depositing an extruded strip over the entire outside surface of a rotating mandrel. The coating obtained in that way is then vulcanized in an autoclave prior to winding on the filament. Although such a method simplifies the method of making the internal thermally-protective coating, it still requires complex tooling to be used such as an extruder, and therefore still presents implementation costs that are high. In particular, it is necessary to vulcanize the coating in order to give it the desired mechanical and thermal characteristics. The operation of vulcanization in an autoclave takes place under the combined effects of pressure (generally of the order of 1 megapascal (MPa) to 3 MPa), and of temperature (typically of the order of 140° C. to 180° C.). As a result, it is necessary for the mandrel to be mechanically dimensioned relative to the autoclave pressure, which leads to mandrel designs that are much more complex than would be necessary when using a mandrel specific for the operation of winding the filament of the structure.

Furthermore, flexible thermally-protective coatings make use of rubbers (a specific association of ingredients) that are specially formulated to perform the three above-specified main functions, i.e. withstanding ablation in the face of thermal and mechanical attack from the propergol combustion gas, providing thermal insulation for the structure, and attenuating mechanical stresses. In addition, given that optimizing the performance of a solid propellant thruster requires its dead weight to be reduced (i.e. including the weight of its internal thermal protection), the ideal material for forming this internal thermal protection needs to present very good resistance to ablation by the thermal mechanical attack from the combustion gas, associated with low density, and low thermal conductivity. Unfortunately, the formulation techniques for obtaining good resistance to ablation and the formulation techniques for obtaining low density (which is generally associated with low thermal conductivity) are mutually antagonistic, so that when only one material is used for performing the thermal protection function, it is necessary to find a compromise in terms of thermal characteristics and ablation characteristics. Finding such a compromise generally leads to a solution that is not good for thruster performance. To mitigate that drawback, it is possible to envisage thermal protection solutions that include function gradients. Such solutions consist in using a material having good resistance to ablation, generally associated with high density, for those layers of the coating that are directly exposed to the combustion gas, while using a material of low density, generally associated with low thermal conductivity, for the underlying layers that are not exposed throughout the time the thruster is in operation. However such solutions are very rarely applied because they lead to additional manufacturing costs, both in terms of preparing the rubber in a non-vulcanized semi-manufactured state, and in terms of actually fabricating the thermal protection elements.

OBJECT AND SUMMARY OF THE INVENTION

The present invention thus seeks to mitigate such drawbacks by proposing a method of making a thermally-protective coating for a thruster structure that considerably reduces implementation operations, thereby simplifying the necessary tooling and manufacturing cycles. The method of the invention makes it possible to obtain a coating by optimally satisfying the functions associated with a thermally-protective coating of a thruster structure. The invention also seeks to propose a method that is equally suitable for making internal thermal protection and external thermal protection for a thruster structure. The invention also seeks to provide a thruster structure fitted with an internal and/or external thermally-protective coating as obtained by the method, and the invention also relates to a thruster structure as made in this way.

To this end, the invention provides a method of making a thermally-protective coating for a thruster structure, the method being characterized in that it consists in: continuously measuring out and mixing at least one polyurethane and a mixture of polymerization agents in which specific fillers have previously been dispersed; coating a rotating cylindrical support surface by continuously casting a strip of touching turns of the resulting mixture; and pre-polymerizing the resulting coating at ambient pressure so that said polyurethane becomes polymerized sufficiently to be capable of being stressed mechanically.

As a result, compared with the methods described above, it is possible significantly to shorten manufacturing cycles for the thermally-protective coating, and thus reduce the cost of making it. The various steps of the method of the invention can be performed on a single, multifunction workstation, and can follow one another continuously without interruption concerning the mixing and casting steps, and can be automated almost entirely.

The mixture for coating the support surface comprises in particular a pre-polymer type polyurethane. Preferably, it has isocyanate terminal groups and is advantageously the result of reacting a polyether with diphenyl-methane-diisocyanate. The polymerizing agents are advantageously of the amine type and/or of the polyol type. In addition, it is preferable to select powder and/or fiber fillers. The powder fillers may be of the silica type and/or an antimony trioxide and/or chlorine-containing compounds, and/or glass microbeads, and/or silica microbeads, and/or acrylonitrile microbeads. Fiber fillers may comprise fibers that are discontinuous, and of the aramid type and/or of the cellulose type.

Such a mixture is remarkable in that in spite of the high filler content needed for performing the thermal protection function, it is in a substantially liquid state on leaving the casting head, it gels quickly so as to avoid flowing away from the support surface while it is being deposited thereon, and after polymerizing at ambient pressure it changes to a state in which it is partially, but sufficiently, polymerized to allow the coating to be subjected to mechanical stress.

By continuously and automatically varying the parameters of the method (such as the concentrations of the various polymerization agents, the casting rate, the speed of rotation of the support surface, the travel speed of the casing head), it is possible to deposit varying thicknesses over surfaces that may be cylindrical or spherical. In addition, when making a thick thermally-protective coating, it is also possible to deposit the coating in a plurality of successive passes, while still maintaining the continuous and automatic nature of the method.

The quantities of polyurethane and of the polymerization agents can be caused to vary so as to obtain both a first mixture and at least one second mixture. Under such circumstances, while maintaining the continuous and automatic nature of the method, it is possible to make a coating on the support surface by covering a casting of a strip of a first mixture, e.g. having good resistance to ablation by the combustion gas, with a casting of a strip of a second mixture, e.g. having low density and low thermal conductivity.

The method may also include a step of machining the pre-polymerized coating to take up a desired external profile. A final step may also be provided consisting in polymerizing the pre-polymerized coating by hot curing.

The method of making a thruster structure of the invention consists in providing a casing with an internal coating and/or an external coating for providing thermal protection that is made by the method described above.

Such a method may be applied to making a thruster structure in which the support surface used for making an internal thermally-protective coating is an outside surface of a rotating mandrel. The casing of the thruster is then deposited and bonded to an outside surface of the coating as made in this way. When the casing of the thruster is obtained by winding a filament of a composite material, the winding of the composite material is preferably polymerized simultaneously with polymerizing the coating by hot curing. The thruster structure obtained in this way is then separated from the mandrel.

The method may also be applied to making a thruster structure in which the support surface used for making an internal thermally-protective coating is an inside surface of the casing of the thruster. Under such circumstances, the casing of the thruster, which is preferably obtained by winding a filament of pre-impregnated fiber material on an outside surface of a mandrel, is itself made prior to the coating operation. After the resulting casing has been separated from the mandrel, the internal thermally-protective coating is then made on an inside surface of the casing, and it is preferably polymerized by hot curing simultaneously with polymerizing the filament winding.

Finally, the method may be applied to making a thruster structure having a casing provided with an external thermally-protective coating, either on its own or in combination with an internal thermally-protective coating. Under such circumstances, the external thermally-protective coating is deposited and bonded to an outside surface of the casing, still by implementing the same method.

BRIEF DESCRIPTION OF THE DRAWING

Other characteristics and advantages of the present invention appear from the following description given with reference to the sole accompanying drawing which shows an implementation having no limiting character.

DETAILED DESCRIPTION OF AN IMPLEMENTATION

In the invention, the method of making a thermally-protective coating for a thruster structure consists essentially in:

a) continuously measuring out and mixing at least one polyurethane and a mixture of polymerization agents in which specific fillers have previously been dispersed;

b) coating a rotating cylindrical support surface by continuously casting a strip of touching turns of the mixture as obtained in this way; and c) pre-polymerizing the resulting coating at ambient temperature so that the polyurethane becomes polymerized sufficiently to be capable of being stressed mechanically.

These implementation steps of the method are performed using devices for making cylindrical coatings. Such devices differ from the devices for making internal thermally-protective coatings that are known in the prior art in that the means for depositing the coating implement mere casting means and not extrusion means. As a result, such devices are not described in detail in the present application. Typically, these devices can be classified in two categories: devices that form a coating on the outside surface of a rotating mandrel, the casing of the thruster being subsequently being deposited and bonded onto the coating made in this way; and devices that form a coating directly on the inside surface or the outside surface of the casing of the thruster.

The sole FIGURE shows an example of a device belonging to the first category. Nevertheless, the present invention can be implemented equally well by devices belonging to either of the two categories. In the FIGURE, the device for making a thermally-protective coating comprises a mandrel 2, e.g. made of metal, mounted on a rotary shaft 4 held by a driving headstock 6 and a moving tailstock 8. The mandrel 2 can rotate continuously in the direction of arrow F. A longitudinal bench 10 extending parallel to the mandrel 2 serves as a support for a carriage 12 capable of moving longitudinally along the bench. A casting head 14 is carried by the carriage 12 via a pole 16 extending perpendicularly to the axis of the mandrel and of the bench. Thus, the casting head 14 can move parallel to the axis of the mandrel and of the bench in the direction of arrow D. The casting head 14 is connected via ducts and metering pumps (not shown) to various receptacles (not shown) storing the various ingredients of the coating.

Step a) of the method of the invention consists in continuously preparing the mixture containing polyurethane for forming the thermally-protective coating. By way of example, the polyurethane may be a pre-polymer of the type having isocyanate terminal groups. Preferably, the polyurethane pre-polymer is the result of reacting a polyether with diphenyl-methane-diisocyanate. The polyurethane is measured out and mixed in the casting head 14 with polymerization agents that have had specific fillers previously dispersed therein. For this purpose, the polyurethane, the or the various polymerization agent(s) (catalysts), and the various fillers are each stored in respective receptacles. Then by using ducts and metering pumps connected to those receptacles, it is possible to convey the desired ingredients at the desired quantities and rates to the casting head. Thus, the quantities of the ingredients may be caused to vary continuously without that interrupting the casting of the resulting mixture. The polymerization agent(s) is/are selected for their rheological characteristics and their polymerization characteristics so that the polyurethane goes from a substantially liquid state on leaving the casting head to a state that is sufficiently viscous for it to adhere to the outside surface of the mandrel 2 without running off it. The "setting time" of the resulting mixture must therefore be very short. For example, for the polymerization agents, it is possible to use amines and/or polyols. In addition, it is preferable to select fillers that are in powder or fiber form. Powder fillers can be of the silica type and/or an antimony trioxide, and/or chlorine-containing compounds, and/or glass microbeads, and/or silica microbeads, and/or acrylonitrile microbeads. Fiber fillers may be discontinuous of the aramid type and/or of the cellulose type.

In addition, it is possible to adjust the quantities of the various ingredients making up the mixture while it is being cast, e.g. in order to make coatings comprising a plurality of superposed layers each having different mixture formulations, with changeover from one formulation to another being progressive or otherwise.

Step b) of the method consists in coating the outside surface of the mandrel 2 by continuously casting touching turns of a strip 18 of the mixture as obtained in this way. The mixture flows from the outlet of the casting head 14 onto the outside surface of the mandrel and thus forms a continuous strip 18. Since the "setting time" of the polyurethane is made to be very short by adding polymerization agents, the strip 18 of mixture gels so as to become viscous and does not run during the continuous rotation of the mandrel. By adjusting the quantities of the various ingredients making up the mixture while casting is taking place (such as the concentrations of the various polymerization agents), and by adjusting the operating parameters of the coating device (such as the speed of rotation of the mandrel 2, the speed of advance of the carriage 12, or indeed the flow rate of the mixture at the outlet from the casting head 14), it is possible to cast a strip 18 in accurately touching turns forming a coating of regular and calibrated thickness over the entire outside surface of the mandrel. Nevertheless, it is also possible to deposit varying thicknesses, and deposition can take place on surfaces that can equally well be cylindrical or spherical. In addition, and when making a thick thermally-protective coating, it is also possible to perform deposition as a plurality of successive passes while still maintaining the continuous and automatic nature of the method.

During step c) of the method, the resulting coating is pre-polymerized. This pre-polymerization step is performed at ambient pressure, and advantageously at ambient temperature. It therefore does not require an autoclave, thereby considerably reducing the cost of implementing the method. This pre-polymerization stage enables the coating to go from a substantially viscous state to a state in which it is polymerized sufficiently to be capable of being stressed mechanically, e.g. during subsequent steps of machining or of providing an outer winding. This change in state of the coating can be understood since the liquid polyurethane is mixed with one or more polymerization catalysts.

Furthermore, after the pre-polymerization step, provision can be made to machine the coating so as to adapt its outside profile to the profile required for depositing and bonding the casing of the thruster.

A final step of polymerization by hot curing the coating as pre-polymerized in this way may be provided. This curing of the coating is likewise performed at ambient pressure, but in an oven. It enables good mechanical and thermal properties to be conferred on the coating. Curing may be performed before depositing and bonding the casing of the thruster (in particular when the casing is made of metal), or after the coating has been deposited and bonded. In particular, when the casing of the thruster is made by winding a filament of pre-impregnated fiber material (e.g. winding a filament of carbon, glass, or polyaramid impregnated in a non-polymerized thermosetting resin) on the outside surface of the coating, it is advantageous to polymerize the coating simultaneous with the stage of polymerizing such a winding of filament. Under such circumstances, the simultaneous polymerization step can also make it possible to obtain the bonding between the coating and the composite structure via a bonding agent previously deposited on the outside surface of the coating.

The method of the invention as described above with reference to the FIGURE is implemented by a device which forms an internal coating by casting a strip on the outside surface of a rotating mandrel, the casing of the thruster being subsequently deposited and bonded on the coating as formed in this way. The method of the invention also applies to a device which forms the internal coating by casting a strip directly onto the inside surface of the casing of the thruster. Under such circumstances, the hollow casing of the thruster structure, made of metal or advantageously out of polymerized composite material, is made before the thermally-protective coating, and is set into rotation between a driving headstock and a moving tailstock. The coating device also comprises a casting head capable of moving inside the casing of the thruster along its longitudinal axis. The method of making the thermally-protective coating is identical to that described above. Prior to the step of continuously casting a strip of the mixture in touching turns, the inside surface of the thruster casing is degreased and treated with a bonding agent. Once the inside surface of the casing has been coated, the resulting coating is pre-polymerized at ambient temperature and pressure, and optionally it is machined. The coating may also be subjected to polymerization in an oven. In this configuration, the method of the invention also achieves a saving in terms of reducing manufacturing costs.

Similarly, the method of the invention may be applied to making an external thermally-protective coating for a thruster structure. Such an external coating is deposited and bonded on an outside surface of the casing of the thruster structure. This external thermally-protective coating can be used either on its own or else in combination with an internal thermally-protective coating. For a casing of composite material that is provided both with an internal coating and with an external coating, it is advantageous to perform polymerization of both coatings simultaneously with the stage of polymerizing the winding and filament constituting the casing.

Bonding between the thermally-protective coating(s) and the casing of the thruster structure is achieved either by using a bonding agent of known type, or by using an adhesive film of polyurethane. Such a film is obtained by metering out polyurethane that has been specially formulated as an adhesive through the casting head 14 and it is deposited by being cast as a continuous strip of touching turns using the method of the invention. This solution makes it possible to avoid using certain known bonding agents such as isocyanates which are deposited by means of a spray gun and which give rise to safety and environmental problems since they require the use of solvents.

Examples of implementations of the method of the invention have been performed under the following conditions:

EXAMPLE 1

Silica-Filled Polyurethane Coating

The various ingredients defined in Table I below were measured out and then mixed in the casting head 14 of the casting device shown in the FIGURE.

TABLE I

| Ingredients | Parts by weight |
| --- | --- |
| MDI - polyether pre-polymer | 100 |
| Polytetrahydrofuran | 510 |
| Amine mixture | 27.7 |
| Silane-treated silica | 179 |
| Catalyst | 0.4 |

The resulting mixture was deposited by being cast continuously as a strip of touching turns on the outside surface of a rotating cylindrical mandrel (mandrel of diameter 0.3 meters (m) and of length 1 m). The casting rate of the mixture, the speed of rotation of the mandrel, and the travel speed of the casting head were adjusted so as to deposit a coating having a uniform thickness of 10 millimeters (mm) in two successive 5 mm-thick passes. After pre-polymerization over about 2 days at ambient temperature, and polymerization for 2 hours at 140° C. (in order to simulate the cycle of polymerizing a casing of composite material), the coating I as made in this way was separated from its mandrel in order to be subjected to certain tests specific to internal thermal protection, namely: traction strength, thermal resistance (thermal conductivity and specific heat), and tests characteristic of firing (measuring the rate of erosion under thermal and mechanical attack from propellant combustion gas). The results of those tests are set out in Table II below, in comparison with a conventional thermally-protective coating II made on the basis of a silica-filled EPDM gum rubber.

TABLE II

| Characteristics | Coating I | Coating II |
| --- | --- | --- |
| Density (g/mL) | 1.17 | 1.1 |
| Breaking strength in traction (MPa) | 17.1 | 13 |
| Elongation on breaking in traction (%) | 380 | 400 |
| Secant tensile modulus at 100% elongation (MPa) | 4.6 | 4 |
| Thermal conductivity (W/m/° C.) | 0.26 | 0.25 |
| Specific heat (J/° K/g) | 1.76 | 1.8 |
| Erosion rate during firing (mm/s) | 0.14 | 0.13 |

From the results given in this table, it can be seen that the characteristics of the coating I obtained by the method of the invention are very close to those of the coating II as obtained conventionally.

EXAMPLE 2

Low Density Coating of Polyurethane Filled with Glass Microbeads

The various ingredients defined in Table III below were measured out and then mixed in the casting head 14 of the casting device shown in the FIGURE.

TABLE III

| Ingredients | Parts by weight |
| --- | --- |
| MDI - polyether pre-polymer | 100 |
| Polytetrahydrofuran | 510 |
| Amine mixture | 27.7 |
| Glass microbeads (0.2 g/mL) | 96 |
| Catalyst | 0.4 |

The conditions, the deposition tools, and the pre-polymerization steps of the resulting mixture were the same as those described for Example 1. After those steps, the resulting coating III was separated from its mandrel and subjected to tests analogous to those described above. The results are given in Table IV below.

TABLE IV

| Characteristics | Coating III |
| --- | --- |
| Density (kg/L) | 0.68 |
| Breaking strength in traction (MPa) | 8 |
| Elongation on breaking in traction (%) | 440 |
| Secant tensile modulus at 100% elongation (MPa) | 4.6 |
| Thermal conductivity (W/m/° C.) | 0.15 |
| Specific heat (J/° K/g) | 1.75 |

The densities measured on samples taken from different points of coating III were about 0.68 g/mL which is close to the theoretical value (0.66) calculated on the basis of the contents and the densities of the various ingredients. This shows that the glass microbeads were relatively unaffected throughout the stages of mixing the various ingredients. Furthermore, no material defect was observed of the bubble type or of poor adhesion between two layers.

EXAMPLE 3

Coating with Superposed Layers Corresponding to Different Formulations

The various ingredients of the formulation defined in Example 1 were measured out and mixed in the casting head of the casting device. The resulting mixture was deposited by being cast continuously to form a strip of touching turns on the outside surface of a rotating cylindrical mandrel (mandrel of diameter 0.3 m and of length 1 m). The casting rate of the mixture, the speed of rotation of the mandrel, and the travel speed of the casting head were adjusted so as to deposit a layer having a thickness of 5 mm in a single pass. After pre-polymerization for 1 hour at ambient temperature, the method was repeated using the ingredients for the formulation defined in Example 2. That mixture was cast in two successive passes each having a thickness of 5 mm so as to obtain a layer having a thickness of 10 mm. After pre-polymerization for 2 days at ambient temperature, and then polymerization for 2 hours at 140° C. (in order to simulate the cycle of polymerizing a casing of composite material), the resulting coating was separated from its mandrel and subjected to various tests. The thicknesses of the layer having the formulation of Example 1 lay in the range 4.6 mm to 5.2 mm. Similarly, the thicknesses of the layer having the formulation of Example 2 lay in the range 9.3 mm to 10.1 mm. No bubble type defect or poor adhesion between the layers was found.

EXAMPLE 4

Silica-Filled Polyurethane Coating Covered in a Carbon-Epoxy Casing

The various ingredients of the formulation defined in Example 1 were measured out and then mixed in the casting head of the casting device. The resulting mixture was deposited by being cast continuously as a strip of touching turns on the outside surface of a rotating cylindrical mandrel (mandrel of diameter 0.3 m and of length 1 m). The casting rate of the mixture, the speed of rotation of the mandrel, and the travel speed of the casting head were adjusted so as to deposit a 5 mm thick layer in a single pass. After pre-polymerization for 7 days at ambient temperature (in order to simulate in realistic manner the maximum waiting time that might occur in an industrial process between the thermally-protective coating being separated from the mandrel and the filament of a composite structure being wound thereon), a carbon fiber wet-impregnated with 120° C. class epoxy resin was wound circumferentially on the coating to a thickness of about 4 mm. After winding, the mandrel fitted in this way was put into a ventilated oven for a polymerization cycle consisting in a temperature rise at a rate of 1° C. per minute up to 140° C., followed by a 2-hour plateau at 140° C., and a fall in temperature at 1° C. per minute. Machining was used to take test pieces from the structure as obtained in that way, each piece having a width of 25 mm, a thickness of about 9 mm, and a curvilinear length of about 300 mm. Adhesion between the thermally-protective coating and the casing was tested on the test pieces using special traction tooling and using a peeling test with an angle of about 90° between the casing and the length of coating on which traction was applied. Under such test conditions, the traction force needed to separate the coating from the casing was greater than 25 decanewtons (daN), which corresponds to good adhesion between those two elements.

The present invention presents numerous advantages, and in particular:

it makes use of a series of automatic operations that follow one another in continuous manner. The coating devices used make it possible to perform continuous operations of measuring out and mixing the ingredients and of casting the resulting mixture. The pre-polymerization of the resulting coating does not require passage in an oven, which means that the same support can be used for the polymerization stage, if any;

it leads to short manufacturing cycles, reducing the time required and the tooling needed, and thus reducing the costs of making the coating. In particular, the number of workstations needed is smaller, since with a single station it is possible to implement the following steps: coating, machining, pre-polymerization, and optionally winding. There is also no need to separate the coating from its support in order to perform the polymerization step, thereby simplifying this step of the method. When the casing of the thruster is made by winding a filament of composite material, it is also possible to make direct use of the mandrel that is for subsequent use in the winding step. It is thus possible to envisage making large thruster structures; and it enables a thermally-protective coating to be obtained that has improved characteristics. It is possible to make coatings having a plurality of superposed layers of different compositions (as described in Example 3). For example, it is possible to deposit a first layer of suitable thickness that is formulated specifically to present good resistance to ablation when subjected to thermal or mechanical attack from the combustion gas, and a second layer, superposed on the first, that is formulated specifically to present low density and low thermal conductivity.

The invention claimed is:

1. A method of making a thermally-protective coating for a thruster structure, the method being characterized in that it consists in:

continuously measuring out and mixing at least one polyurethane and a mixture of polymerization agents in which specific fillers have previously been dispersed;

coating a rotating cylindrical support surface by continuously casting a strip of touching turns of the resulting mixture; and pre-polymerizing the resulting coating at ambient pressure so that said polyurethane becomes polymerized sufficiently to be capable of being stressed mechanically.

2. A method according to claim 1, characterized in that said polyurethane has isocyanate terminal groups, said polymerization agents are amines and/or polyols, and said specific fillers are in powder or fiber form.

3. A method according to claim 2, characterized in that said polyurethane is the result of reacting a polyether with diphenyl-methane-diisocyanate.

4. A method according to claim 3, characterized in that:

the continuous casting of said strip of mixture is adjusted so as to obtain both a coating of varying thickness over the entire surface of the support;

the measuring out of said polyurethane and of said mixture of polymerization agents and fillers varies in such a manner as to obtain both a first mixture and at least one second mixture different from the first;

said coating of the surface of the support is obtained by means of a first casting of a strip of said first mixture, and by means of at least one second casting, superposed on the first, of a strip of said second mixture;

the step consisting in pre-polymerizing said coating at ambient pressure, also takes place at ambient temperature;

it further comprises a step of machining said pre-polymerized coating to have a desired outside profile;

it further comprises a step of polymerizing said pre-polymerized coating.

5. A method of making a thruster structure comprising a casing fitted with an internal thermally-protective coating and/or an external thermally-protective coating, the method being characterized in that said thermally-protective coating is made in accordance with claim 4.

6. A method according to claim 5, characterized in that an internal thermally-protective coating is deposited and bonded on an inside surface of said casing after the casing has been obtained.

7. A method according to claim 6, characterized in that:
an external thermally-protective coating is deposited and bonded on an outside surface of said casing;
the bonding between said casing and the thermally-protective coating(s) is implemented with the help of a bonding agent;
the bonding between said casing and said thermally-protective coating is implemented with the help of a film of adhesive polyurethane obtained by continuously casting a strip of touching turns;
said casing of the thruster is made of metal;
said casing of the thruster is obtained by winding a filament of pre-impregnated fiber material;
the thermally-protective coating(s) and said filament winding are polymerized simultaneously.

8. A method according to claim 5, characterized in that the internal thermally-protective coating is made on an outside surface of a mandrel, said casing of the thruster being deposited and bonded on an outside surface of said thermally-protective coating.

9. A method according to claim 8, characterized in that:
an external thermally-protective coating is deposited and bonded on an outside surface of said casing;
the bonding between said casing and the thermally-protective coating(s) is implemented with the help of a bonding agent;
the bonding between said casing and said thermally-protective coating is implemented with the help of a film of adhesive polyurethane obtained by continuously casting a strip of touching turns;
said casing of the thruster is made of metal;
said casing of the thruster is obtained by winding a filament of pre-impregnated fiber material;
the thermally-protective coating(s) and said filament winding are polymerized simultaneously.

10. A method of making a thruster structure comprising a casing fitted with an internal thermally-protective coating and/or an external thermally-protective coating, the method being characterized in that said thermally-protective coating is made in accordance with claim.

11. A method according to claim 10, characterized in that the internal thermally-protective coating is made on an outside surface of a mandrel, said casing of the thruster being deposited and bonded on an outside surface of said thermally-protective coating.

12. A method according to claim 11, characterized in that the bonding between said casing and the thermally-protective coating(s) is implemented with the help of a bonding agent.

13. A method according to claim 11, characterized in that the bonding between said casing and said thermally-protective coating is implemented with the help of a film of adhesive polyurethane obtained by continuously casting a strip of touching turns.

14. A method according to claim 10, characterized in that said casing of the thruster is obtained by winding a filament of pre-impregnated fiber material.

15. A method according to claim 14, characterized in that the thermally-protective coating(s) and said filament winding are polymerized simultaneously.

16. A method according to claim 10, characterized in that an internal thermally-protective coating is deposited and bonded on an inside surface of said casing after the casing has been obtained.

17. A method according to claim 10, characterized in that an external thermally-protective coating is deposited and bonded on an outside surface of said casing.

18. A method according to claim 10, characterized in that said casing of the thruster is made of metal.

19. A method according to claim 1, characterized in that the continuous casting of said strip of mixture is adjusted so as to obtain both a coating of varying thickness over the entire surface of the support.

20. A method according to claim 1, characterized in that the measuring out of said polyurethane and of said mixture of polymerization agents and fillers varies in such a manner as to obtain both a first mixture and at least one second mixture different from the first.

21. A method according to claim 20, characterized in that said coating of the surface of the support is obtained by means of a first casting of a strip of said first mixture, and by means of at least one second casting, superposed on the first, of a strip of said second mixture.

22. A method according to claim 1, characterized in that the step consisting in pre-polymerizing said coating at ambient pressure, also takes place at ambient temperature.

23. A method according to claim 1, characterized in that it further comprises a step of machining said pre-polymerized coating to have a desired outside profile.

24. A method according to claim 1, characterized in that it further comprises a step of polymerizing said pre-polymerized coating.

* * * * *

UNITED STATES PATENT AND TRADEMARK OFFICE
CERTIFICATE OF CORRECTION

| | | |
|---|---|---|
| PATENT NO. | : 7,368,025 B2 | Page 1 of 1 |
| APPLICATION NO. | : 10/540790 | |
| DATED | : May 6, 2008 | |
| INVENTOR(S) | : Jacques Bourdoncle et al. | |

It is certified that error appears in the above-identified patent and that said Letters Patent is hereby corrected as shown below:

Column 12, claim 10, line 2, "claim." should read --claim 1.--.

Signed and Sealed this

Eleventh Day of August, 2009

David J. Kappos
*Director of the United States Patent and Trademark Office*